March 24, 1959  M. C. FERRE  2,879,402
DIRECTIONAL NEUTRON DETECTOR
Filed July 3, 1953

INVENTOR.
MAURICE C. FERRE
BY
Campbell, Brumbaugh, Free & Graves
HIS ATTORNEYS.

2,879,402
DIRECTIONAL NEUTRON DETECTOR

Maurice C. Ferre, Ridgefield, Conn., assignor, by mesne assignments, to Schlumberger Well Surveying Corporation, Houston, Tex., a corporation of Texas Application July 3, 1953, Serial No. 365,924

12 Claims. (Cl. 250—83.6)

This invention relates to neutron detectors, and more particularly to an improved neutron detector exhibiting a directional response characteristic to incident neutrons.

Although useful in a wide variety of applications, improved neutron detector means embodying the present invention is ideally suited for use in apparatus of the type employed for making neutron-neutron logs of earth formations traversed by a bore hole drilled into the earth. For convenience, the invention will be described as embodied in a typical system of this general character.

Typical neutron well logging apparatus is disclosed in the copending application Serial No. 325,582, of J. Tittman, filed December 12, 1952, now U.S. Patent No. 2,778,951, for "Neutron Logging Method and Apparatus," and assigned to the same assignee as is the present application. In the neutron-neutron well logging system there disclosed, a source of neutrons and a suitable neutron detector are lowered into a bore hole in fixed spaced apart relation. Neutrons emitted by the source enter the surrounding formations and are affected thereby in a manner depending upon the initial energy of the neutrons and the nature of the formations. Detection of the neutrons returned at thermal or epithermal energy levels thus yields some information about the formations.

However, neutrons returning to the logging instrument, after traversing and being slowed by the drilling fluid usually present in the bore hole, are also detected and tend to mask the information sought pertaining to the formations. To obviate this undesirable condition, the neutron detector in the Tittman system is maintained in close association with the sidewall of the bore hole and is provided with shielding means located externally of the detector for intercepting neutrons affected primarily by the drilling fluid. In this manner, the equipment is made more receptive to neutrons carrying information pertaining to the earth formations.

Since neutrons carry no electrical charge, present day neutron detectors indicate their presence by various interactions. For example, one class of detectors utilizes an element, such as boron, having an isotope of atomic weight ten ($B^{10}$) which reacts with neutrons giving an alpha particle and lithium. The alpha particle and recoiling lithium neucleus are able to produce ionization in a gas and thus are detectable.

The capture cross-section of $B^{10}$ nuclei regarding thermal and epithermal neutrons is very large. Accordingly, this isotope of boron is well suited as a shield material for such neutrons.

It is an object of the present invention to provide an improved markedly directional neutron detector which makes use of these two aspects of a material such as boron, namely, the production of alpha particles and the capture of neutrons, in a compact, unitary structure.

Another object of the present invention is to provide an improved neutron detector exhibiting a markedly directional response characteristic to incident neutrons and featuring increased operating efficiency as compared with conventional detector apparatus.

Directionally responsive neutron detector means constructed in accordance with the present invention comprises a fluid tight neutron permeable envelope filled with an ionizable gas at a preselected pressure. The interior surface of the envelope is coated with a material, such as boron, capable of capturing neutrons and reacting therewith to produce particles which ionize the gas, such as alpha particles. Part of the internal coating facing the direction from which desired neutron radiation is anticipated is made relatively thin so as to constitute window means in which incident thermal or epithermal neutrons react to produce alpha particles that enter and ionize the gas. Another part of the coating in the path of undesired neutron radiation is made relatively thick so as to form a shield portion wherein essentially all thermal or epithermal neutrons entering from points external of the detector are absorbed, substantially none of the resulting alpha particles being capable of reaching the gas within the detector. Thus, the response characteristic of the neutron detector to incident neutrons is markedly directional.

The invention may best be understood by reference to the following detailed description taken in connection with the accompanying drawing in which.

Figure 1:
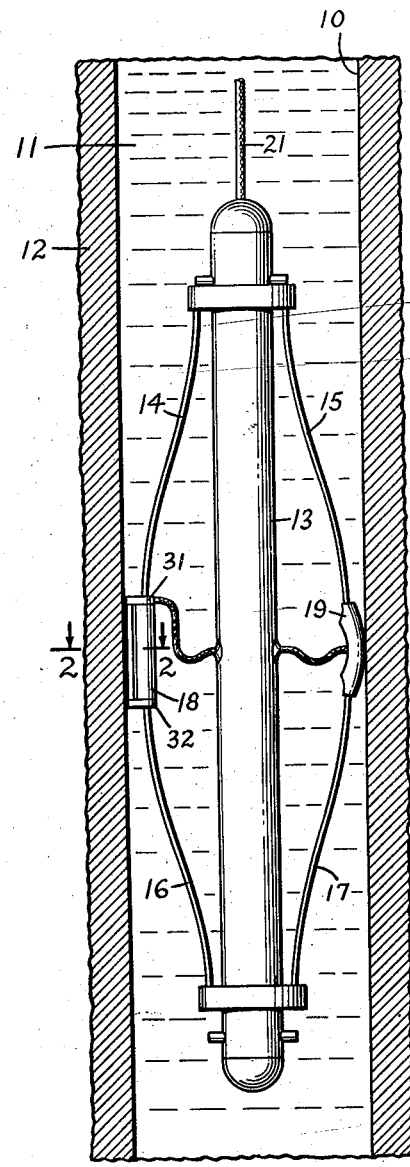
Fig. 1 is a side view of typical neutron logging apparatus including a neutron detector constructed according to the present invention disposed in a bore hole formed in the earth.

In Fig. 1 of the drawing, there is shown a bore hole 10 containing a drilling mud 11. Apparatus suitable for neutron-neutron logging of the formations 12 traversed by the bore hole 10 comprises an elongated cylindrical housing 13 slidably supporting oppositely disposed upper springs 14 and 15 and corresponding lower springs 16 and 17 at their upper and lower extremities, respectively. The springs 14 and 16 are arranged to support a neutron logging probe 18 resiliently against the sidewall of the bore hole 10. The springs 15 and 17 support a pad 19 pressed against the opposite sidewall of the bore hole to balance the force exerted by springs 14 and 16 and thus maintain the housing 13 substantially centered in the bore hole.

The pad 19 may include electrodes for making electrical logs simultaneously with the neutron log, or carry any of a variety of measuring devices, such as mud cake detectors, etc. Other well-known means for supporting and biasing the neutron logging probe 18 against the sidewall of the bore hole 10 may, of course, be employed.

A cable 21 is secured to the housing 13 and is utilized for raising and lowering the apparatus in the bore hole in a well-known manner. The cable incorporates electrical conductors (not shown) for making connection with control or indicating apparatus at the earth's surface.

Figure 2:
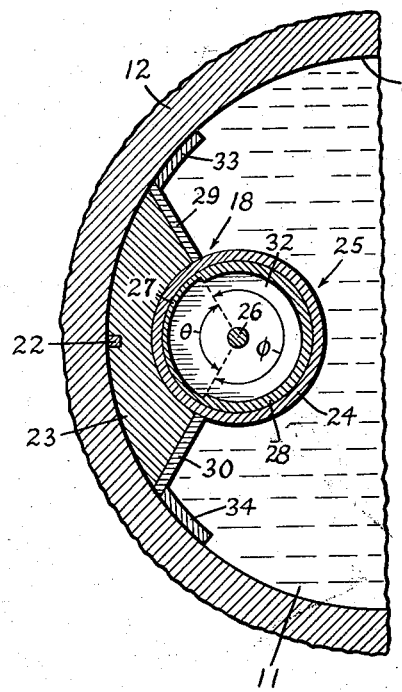
Fig. 2 is a transverse sectional view, taken along the line 2—2 and looking in the direction of the arrows, of a portion of the apparatus shown in Fig. 1, drawn to an enlarged scale.

As shown in Fig. 2, the probe 18 comprises a source 22 of high energy neutrons formed, for example, by a radium-beryllium pellet supported in front of a mud displacer 23 of generally arcuate configuration in transverse section. The mud displacer 23 is composed of a neutron permeable material such as aluminum, for example.

A neutron detector 24, constructed in accordance with the present invention, is disposed in abutment with the rear portion of the mud displacer 23. The detector 24 is of generally cylindrical cross-section and comprises a cylindrical, fluid-tight, neutron permeable envelope 25 constructed, for example, of steel, and filled with an ionizable gas, such as argon, at a pressure of one-half atmosphere. A central electrode 26 is disposed coaxially within the cylinder 25 and in order to detect ionization of the gas, a suitable circuit (not shown) may be connected between the outer shell 25 and the central electrode 26 in a well-known manner.

To render the detector 24 responsive to incident neutrons emanating from a given direction, that is, to provide an operating characteristic for it that is markedly directional, the inner surface of the envelope 25 is coated with a layer of material capable of reacting with and absorbing neutrons to produce particles such as alpha particles, that are capable of ionizing the gas within the detector. For example, a layer of boron of mass 10 is disposed on the interior surface of the cylindrical envelope 25 in two thicknesses, i.e., a relatively thin window portion 27 which faces the formations 12 traversed by the hole 10, and a relatively thick shield portion 28 facing the mud column 11 of the bore hole. As shown in Fig. 2, the window 27 and the shield 28 extend through contiguous arcs $\theta$ and $\phi$, respectively. Preferably, the arc $\theta$ is smaller than the arc $\phi$, these arcs being suitably apportioned to provide optimum response to neutrons arriving from points within the formation 12, in accordance with the teachings of the aforementioned Tittman application.

The window 27 is made thin enough so that the alpha particles resulting from reactions with incident neutrons may reach the gas within the detector. For example, it may have a thickness of the order of .01 mm, a thickness of .005 mm. being preferred. The shield layer 28 is made thick enough so that none of the alpha particles resulting from reactions with neutrons arriving from the fluid 11 in the bore hole 10 are capable of reaching the gas within the detector 24. This layer may be at least 0.1 mm. thick.

In order to achieve further discrimination against low energy neutrons arriving from points within the surrounding column of drilling mud 11, the sides of the mud displacer 23 are bounded by shields 29, 30, 31 and 32 that extend in a generally radial direction from the envelope 25. The shield members 29 and 30 effectively constitute a continuation of the shield layer 28 of the detector 24 and they terminate in arcuate, neutron shields or barrier flaps 33 and 34. The barrier flaps are preferably resilient and are maintained in essentially conforming engagement with the sidewall of the bore hole 10. The shield portions 29, 30, 31 and 32, as well as the barrier flaps 33 and 34, are constructed of a neutron absorbing or shielding material, such as boron, or boron carbide in granular form received by a suitably shaped container made of any appropriate material such as the tetrafluoroethylene polymer sold under the name "Teflon," for example.

In operation, the logging apparatus is moved through the well 10 by means of the cable 21 with the probe 18 bearing against the sidewall of the bore hole. High energy neutrons from the source 22 penetrate the formation 12. These neutrons become scattered by elastic collisions and eventually are slowed down to thermal or epithermal energy at various places in the formation. Some of these low energy neutrons are directed through the neutron transparent mud displacer 23, traverse the envelope 25, and are captured by the window 27. A portion of the resultant alpha particles and recoiling lithium nuclei causes ionization of the gas within the detector 24 and produces electrical signals in the circuit of which it is a part, thereby producing indications of the corresponding neutrons.

Those of the slow neutrons which are not captured by the window 27 may travel through the gas and impinge upon the interior surface of the shield layer 28. Of these, some may pass entirely through the detector, but others may be absorbed before traveling too deeply into the shield layer. As a consequence, alpha particles and recoiling lithium nuclei are produced, some of which are directed back into the gas in the detector 24. Ionization thus occurs and again the corresponding neutrons are indicated.

Of the neutrons which reach the drilling liquid 11 and are returned after being slowed down to thermal or epithermal energy levels, few if any penetrate deeply enough into the shield layer 28 to cause the production of alpha particles and/or lithium nuclei capable of reaching and ionizing the gas in the detector. Others of these neutrons are absorbed by the shield portions 29-34, inclusive.

Obviously, the detector 24 is markedly directional in its response, i.e., of the detected neutrons, the number of low energy neutrons slowed solely by the drilling liquid 11 is extremely small as compared with the number of low energy neutrons slowed by the formations 12. Accordingly, accurate indications regarding the characteristics of the formations may be derived without undesirable masking effects from neutrons returned by the drilling fluid 11. The general theory of this type of operation is described more fully in the aforementioned copending application of J. Tittman.

It is evident, therefore, that a neutron detector constructed in accordance with the present invention employs a material, such as baron, in a compact unitary structure and utilizes this material for the production of alpha particles in connection with effecting indications and for the capture of neutrons in connection with shielding.

Furthermore, by providing the shield layer 28 on the interior surface of the envelope 25, increased operating efficiency is achieved. This is understandable because if the shield layer is disposed at the exterior surface of the envelope, as in conventional arrangements, neutrons which pass from the formations through the detector and into the shield structure produce alpha particles that are absorbed by the shield structure or by the envelope. Thus, no indications are produced.

The detector may, of course, be filled with other kinds of gases. For example, boron tri-fluoride or hydrogen gas may be employed. In either of these cases, the operation is essentially the same as just described. However, additional alpha particles resulting from neutron capture within the gas itself are derived, increasing the efficiency of the detector.

Figure 3:
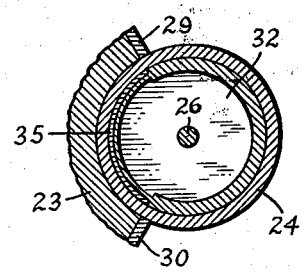
Fig. 3 is also a view in transverse section of a modified form of neutron detector according to the invention.

Although the detector 24 has been described as being responsive to neutrons of thermal and epithermal energy levels, it may be modified so as to be selective to epithermal neutrons alone. For example, a cadmium filter 35 (Fig. 3) may be positioned in front of the window portion 27 and arranged to absorb completely neutrons of thermal energy while permitting neutrons of epithermal energy to reach the window 27. Moreover, the thickness of the boron material in the window 27 may be preselected to provide a desired response characteristic in a known manner.

Although boron is the coating material employed in the specific embodiment described above, it will be understood that coating materials such as lithium, for example, may be used.

While a particular embodiment of the present invention has been shown and described, it is apparent that changes and modifications may be made without departing from this invention in its broader aspects, and, therefore, the aim in the appended claims is to cover all such changes and modifications as fall within the true spirit and scope of this invention.

I claim:

1. In directional neutron responsive apparatus, the combination of material defining a chamber and adapted to generate particles upon irradiation with neutrons, and an ionizable gas in said chamber, said material being relatively thin on a portion of the chamber facing in a given direction so that the particles generated by said thin portion will ionize said gas, and being relatively thick on another portion of the chamber so as to shield said chamber portion from neutrons external thereto.

2. In directional neutron responsive apparatus, the combination of a neutron permeable envelope defining a chamber, an ionizable gas in said chamber, and material lining said envelope and adapted to react in response to irradiation with neutrons for generating particles, said material being relatively thin on the portion of said envelope facing a given direction so that the particles generated by the thin portion of said material will ionize the gas in said chamber, and being relatively thick on another portion of the envelope so as to shield said envelope portion from neutrons external thereto.

3. Directional neutron responsive apparatus as defined in claim 2 in which the lining material is an isotope of boron having an atomic weight of ten.

4. Directional neutron responsive apparatus as defined in claim 2 in which the lining material is an isotope of boron having an atomic weight of ten, the thickness of the lining material on the envelope portion facing said given direction is of the order of .01 mm., and the thickness of the lining material on said another envelope portion being at least about 0.1 mm.

5. In apparatus for detecting neutrons from a predetermined direction, the combination of neutron permeable wall means defining a substantially cylindrical chamber, an ionizable gas in said chamber, material lining said chamber and reacting in response to neutron irradiation to generate particles, said material being relatively thin on a portion of said wall means facing in said direction and relatively thick on a portion of said wall means facing in a different direction, and neutron shielding means adjacent the intersection of said thin and thick portions, said shielding means extending radially from said chamber, so that substantially only particles generated in response to irradiation of said material with neutrons from said predetermined direction will ionize the gas in said chamber.

6. In directional neutron detecting apparatus, the combination of neutron permeable wall means defining a substantially cylindrical chamber, an ionizable gas in said chamber, material lining said chamber and responsive to irradiation with neutrons for generating particles, said material being relatively thin on a portion of said wall means facing a given direction and relatively thick on another portion of said wall means facing in a different direction, neutron filter means disposed to intercept neutrons moving towards said relatively thin portion, said filter means selectively passing said neutrons so that substantial ionization of said gas will be accomplished by only the neutrons passed by said filter means.

7. In apparatus for investigating the response of substances to neutron irradiation, the combination of a source of high energy neutrons disposed to irradiate a substance, and a low energy neutron detector disposed to receive neutrons from said substance, said detector including neutron permeable wall means defining a chamber, an ionizable gas in said chamber, and material lining said wall means and adapted to react in response to irradiation with low energy neutrons to generate particles, said material being relatively thin on a portion of said wall means in the path of neutrons from said substance and relatively thick elsewhere on said wall means.

8. In apparatus for investigating the response of substances to neutron irradiation, the combination of a source of high energy neutrons supported by a neutron transmitting member, a neutron detector spaced from said source by said member, said detector including neutron permeable wall means defining a substantially cylindrical chamber, an ionizable gas in said chamber, material lining said wall means and reacting in response to irradiation with neutrons for generating particles, said material being relatively thin on a portion of said wall means adjacent said member and relatively thick on the remainder of said wall means, and neutron shielding means adjacent the sides of said member and cooperating with said detector to form a neutron transmission channel to said material thin portion.

9. Apparatus as defined in claim 8 in which filter means is disposed in said neutron transmission channel for passing only epithermal neutrons to said material thin portion.

10. Apparatus as defined in claim 8 in which the lining material is an isotope of boron of atomic weight ten, the thickness of said thin portion is of the order of .01 mm. and the thickness of said relatively thick portion is at least about 0.1 mm.

11. In neutron well logging apparatus, the combination of a source of high energy neutrons, a neutron transmitting member for supporting said source adjacent the well wall, said member having an outer face substantially conforming to said well wall, neutron detector means spaced from said source by said member, said detector means including neutron permeable wall means defining a substantially cylindrical chamber, an ionizable gas in said chamber, material lining said wall means and reacting in response to irradiation with neutrons for generating particles, said material being relatively thin on a portion of said wall means adjacent said member and relatively thick on the remaining portion of said wall means, neutron shielding means extending radially from said wall means adjacent said member and forming a neutron transmission channel from the well wall to said thin portion, flexible neutron shielding means terminating said shielding means and adapted to conform to the bore hole wall, and means urging said member and detector means towards said well wall.

12. In neutron well logging apparatus, the combination of a source of high energy neutrons, a neutron transmitting member for supporting said source adjacent the well wall, said member having an outer face substantially conforming to said wall, neutron detector means spaced from said source by said member, said detector means including a neutron permeable envelope defining a chamber, an ionizable gas in said chamber, material lining said envelope reacting in response to irradiation with low energy neutrons to generate particles, said material being relatively thin on a portion of said envelope facing a predetermined horizontal segment of the bore hole wall and relatively thick on the remaining portion of said envelope, filter means disposed between said thin portion and said envelope, said filter means selectively passing neutrons in a predetermined narrow low energy range so that particles generated in said thin material in response to said low energy range neutrons will ionize said gas while particles generated in said thick material in response to neutrons incident on the outer face thereof will not reach said gas in any substantial quantities.

References Cited in the file of this patent
UNITED STATES PATENTS

| | | |
|---|---|---|
| 2,220,509 | Brons | Nov. 5, 1940 |
| 2,469,461 | Russell | May 10, 1949 |
| 2,556,768 | McKibben | June 12, 1951 |
| 2,736,816 | Morley | Feb. 28, 1956 |